Figure 1:
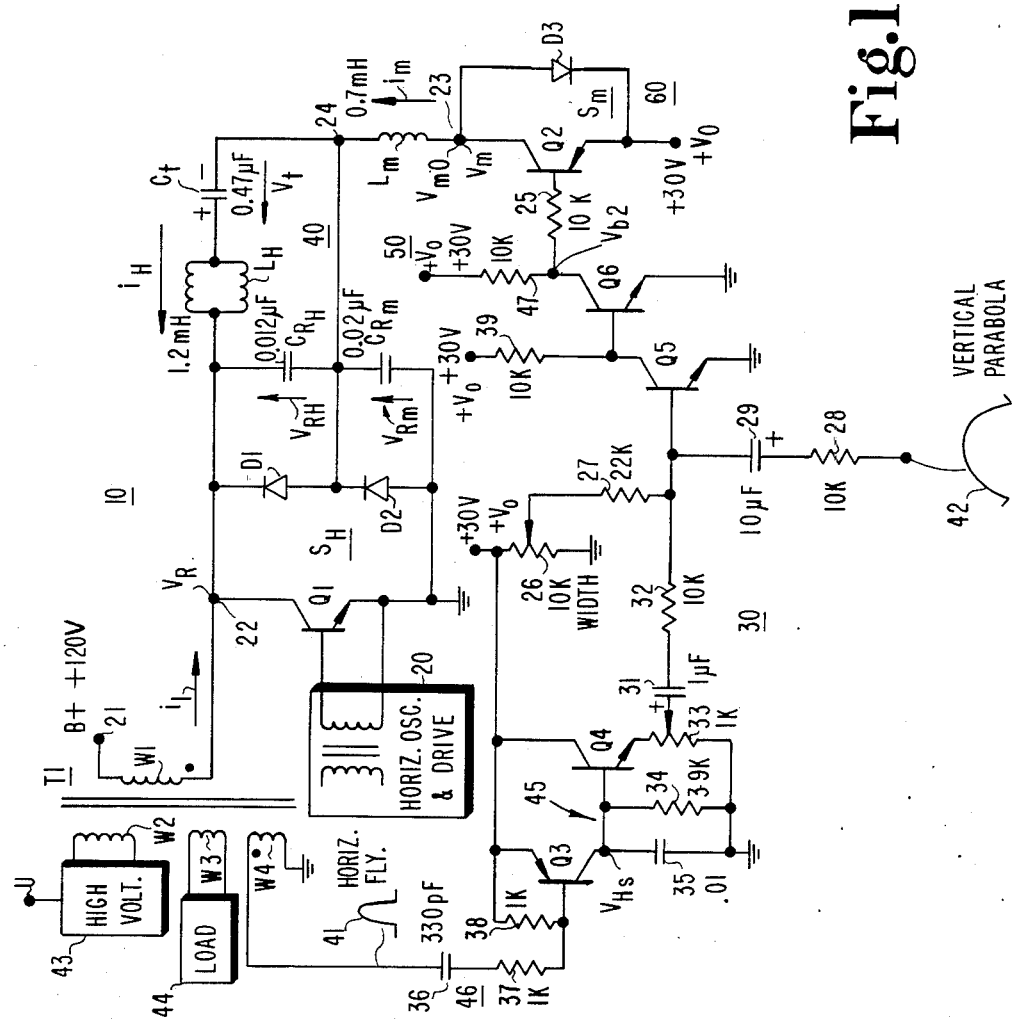

United States Patent [19]

Willis

[11] Patent Number: 4,625,154
[45] Date of Patent: Nov. 25, 1986

[54] DEFLECTION CIRCUIT WITH A SWITCHED MODE MODULATOR CIRCUIT

[75] Inventor: Donald H. Willis, Indianapolis, Ind.
[73] Assignee: RCA Corporation, Princeton, N.J.
[21] Appl. No.: 760,546
[22] Filed: Jul. 30, 1985
[51] Int. Cl.$^4$ ............................................. H01J 29/56
[52] U.S. Cl. ................................................... 315/371
[58] Field of Search ......................... 315/371, 368, 408
[56] References Cited

U.S. PATENT DOCUMENTS

| | | | |
|---|---|---|---|
| 4,118,655 | 10/1978 | Wolber | 315/371 |
| 4,140,949 | 2/1979 | Terry | 315/371 |
| 4,469,992 | 9/1984 | Favreau | 315/371 |

FOREIGN PATENT DOCUMENTS 2150796A  7/1985  United Kingdom .

OTHER PUBLICATIONS

RCA Corporation, Laboratories RCA Limited, Zurich, Switzerland, Report No. MRZ-282, date Feb. 1984, G. Forster and A. Schlussel entitled "A Horizontal Deflection and East-West Raster Correction Circuit for Operation at Twice Horizontal Rate (31.25 kHz)".

Primary Examiner—Theodore M. Blum
Attorney, Agent, or Firm—Eugene M. Whitacre; Paul J. Rasmussen; Joseph J. Laks

[57] ABSTRACT

A trace switch, operated at a line rate, is coupled to a line deflection winding and a trace capacitance for applying a trace voltage to the deflection winding to generate line scanning current in the deflection winding. A deflection retrace capacitance is coupled to the deflection winding for forming a deflection retrace resonant circuit during the line retrace interval to generate a deflection retrace pulse voltage. A modulator inductance is coupled to the trace switch and to the line deflection winding. A modulator switch applies a line rate, switched mode, modulation voltage directly to the modulator inductance to control the amplitude of the current in the modulator inductance at the end of the line trace interval. A modulator retrace capacitance is coupled by the modulator switch to the modulator inductance during the line retrace interval for forming a modulator retrace resonant circuit. The switched mode modulation voltage is varied at a field rate to provide side pincushion correction to the line scanning current.

20 Claims, 2 Drawing Figures

DEFLECTION CIRCUIT WITH A SWITCHED MODE MODULATOR CIRCUIT

This invention relates to a deflection circuit with a switched mode modulator circuit.

Active side pincushion correction circuits are known which vary the amplitude of the line scanning current at a vertical rate in a parabolic manner to provide side pincushion correction. In one form of a diode modulator type side pincushion correction circuit, the modulation voltage is developed across a modulator capacitor and applied to the modulator inductor to generate a line repetitive, sawtooth current in the modulator inductor during the entire trace interval. To provide side pincushion correction, a transistor coupled in shunt with the modulator capacitor is operated Class A to discharge the modulator capacitor at a vertical rate in a parabolic manner. Such an example of a diode modulator has several disadvantages. Since the modulating transistor is operated Class A, the transistor dissipates significant power. Additionally, a relatively expensive capacitor is used for developing the modulation voltage.

In another form of a diode modulator, a line rate, switched mode, modulator voltage is applied to a relatively large input choke coupled to the modulator inductor. The choke current is injected into the diode modulator circuit for controlling the amplitude of the line scanning current. The switched mode modulator voltage is varied at a vertical rate in a parabolic manner to modulate the amplitude of the current that is injected into the diode modulator circuit for providing side pincushion correction to the line scanning current. Such an example of a diode modulator also has several disadvantages. In addition to the modulator inductor, a relatively large input choke is used. Furthermore, in some versions of a choke supplied, diode modulator, a modulator capacitor is also used.

In accordance with a feature of the invention, a switched mode modulator circuit modulates the line scanning current without the need for either an input choke or a modulator capacitor. Also, by operating the modulator circuit in the switched mode rather than in Class A, resistive losses are kept relatively small.

A switched mode modulator circuit includes a line deflection winding and a trace capacitance. A trace switch is operated at a line rate for applying a trace voltage to the deflection winding to generate line scanning current in the line deflection winding. A deflection retrace capacitance forms a deflection retrace resonant circuit with the deflection winding during the retrace interval to generate a deflection retrace pulse voltage. A modulator inductance is coupled to the trace switch and to the deflection winding. A modulator retrace capacitance is coupled to the modulator inductance and forms a modulator retrace resonant circuit during the retrace interval. A modulator switch is coupled to a voltage supply and to the modulator inductance and is responsive to a line rate signal and to a modulator control signal for switching conductive states at a controllable instant within the line trace interval that varies in accordance with the modulator control signal to thereby modulate the line scanning current.

Figure 2:
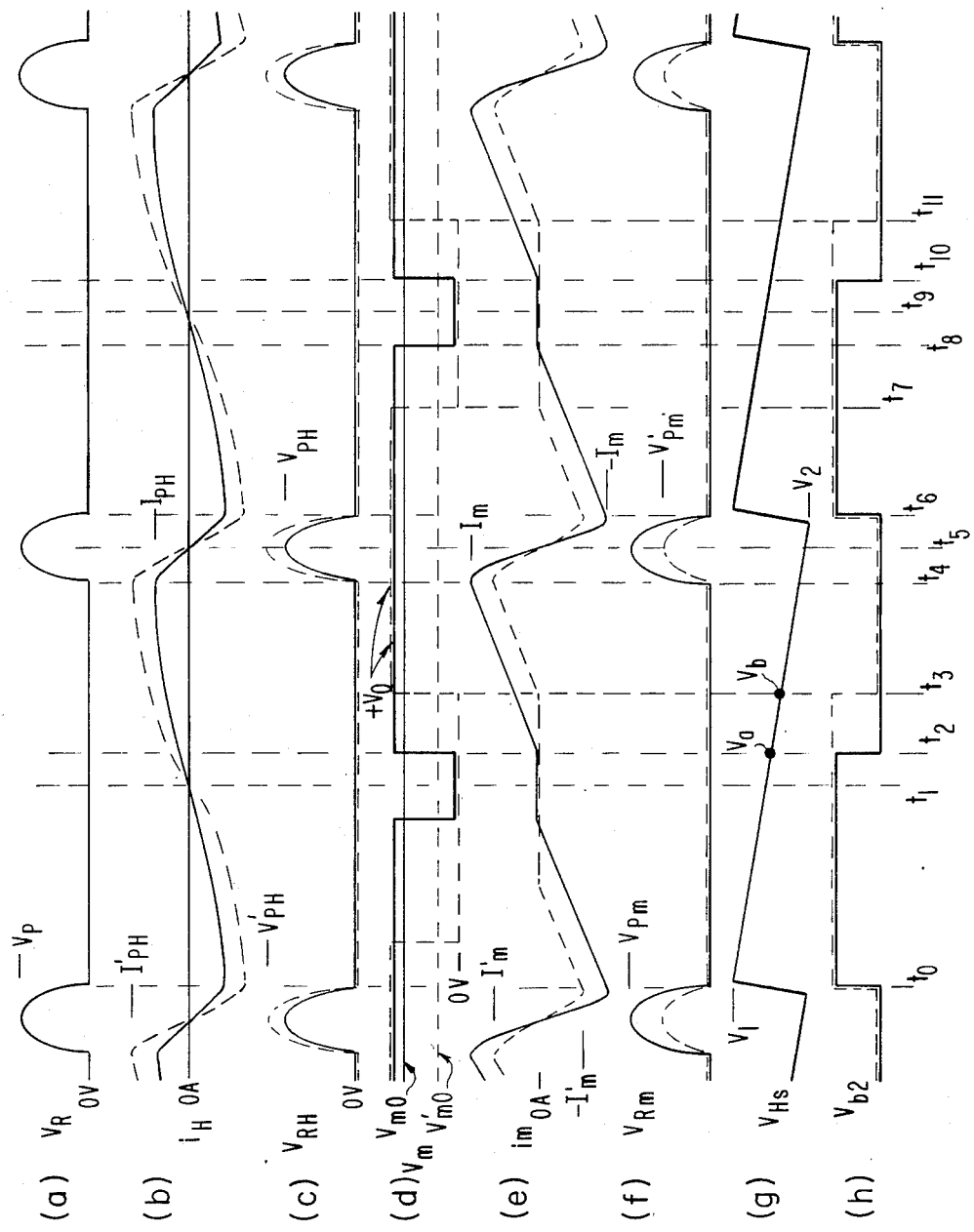

FIG. 1 illustrates a switched mode side pincushion correction circuit embodying the invention; and FIG. 2 illustrates waveforms associated with the operation of the circuit of FIG. 1.

In the side pincushion corrected line deflection circuit 10 of FIG. 1, a regulated direct current B+ supply voltage is applied to the primary winding W1 of a horizontal flyback transformer T1 at a terminal 21. Another terminal of primary winding W1, terminal 22, is coupled to a line trace switch $S_H$, comprising a horizontal output transistor Q1 coupled in parallel with series coupled damper diodes D1 and D2. Paralleling damper diode D1 is a deflection retrace capacitor $C_{RH}$ and a series coupled horizontal deflection winding $L_H$ and S-shaping or trace capacitor $C_t$.

A switched mode side pincushion correction circuit 60, embodying the invention, is coupled to horizontal deflection winding $L_H$ and to trace switch $S_H$ for providing side pincushion correction to line scanning current $i_H$. Side pincushion correction circuit 60 includes a modulator inductor $L_m$ that is coupled to the junction of damper diodes D1 and D2, at a terminal 24, and that is coupled to a modulator switch $S_m$ at a terminal 23. A modulator retrace capacitor $C_{Rm}$ parallels damper diode D2.

Modulator switch $S_m$ includes a transistor switch Q2 that is coupled to a source of DC supply voltage $+V_0$ and that is coupled to modulator inductor $L_m$ at terminal 23. A diode switch D3 parallels transistor switch Q2 and is poled to conduct current in a direction opposite that of transistor Q2. A switched mode control circuit 30 is coupled to the base of transistor Q2 to generate a line rate, switched mode modulator voltage $V_m$ at switch output terminal 23 that is directly applied to modulator inductor $L_m$. Modulator voltage $V_m$ controls the modulator current $i_m$ in modulator inductor $L_m$.

In operation, horizontal output transistor Q1 is switched at a line rate by a horizontal oscillator and driver circuit 20 to generate line scanning current $i_H$ in horizontal deflection winding $L_H$. During the line trace interval, $t_0$–$t_4$, of the waveforms of FIG. 2, horizontal trace switch $S_H$ is closed to apply across horizontal deflection winding $L_H$ the trace voltage $V_t$ developed by trace capacitor $C_t$. An upwardly ramping, line scanning current $i_H$, illustrated in solid-line in FIG. 2b, is developed during the line trace interval.

During the first half of the line trace interval, prior to time $t_1$, the center of trace, line scanning current $L_H$ is negative and flows in damper diode D1. In the first half of trace, the current $i_1$ in flyback transformer primary winding W1 is also negative. Damper diode D2 is, therefore, conductive to provide a path for current $i_1$ from ground to the B+ supply terminal 21 via damper diodes D1 and D2. During the second half of the line trace interval, after time $t_1$, line scanning current $i_H$ is positive, with current flowing out of terminal 22 to horizontal output transistor Q1 and returning to terminal 24 via conducting damper diode D2. Thus, during the entire trace interval, $t_0$–$t_4$, terminals 22 and 24 are essentially at ground potential due to the simultaneous conduction of damper diodes D2 and D1 or damper diode D2 and horizontal output transistor Q1.

In switched mode side pincushion circuit 60, transistor Q2 of modulator switch $S_m$ is operated at a line rate by a switching voltage $V_{b2}$, illustrated in solid-line in FIG. 2h. Voltage $V_{b2}$ is developed by a control circuit 30 and is applied to the base of transistor Q2 via a resistor 25. At a controlled, variable instant within the line trace interval, at time $t_2$ of FIG. 2h, for example, switched mode control voltage $V_{b2}$ goes low, turning on transistor Q2. Supply voltage $+V_0$ is applied at terminal 23 to modulator inductor $L_m$, as illustrated by the solid-line modulator voltage $V_m$ of FIG. 2d. Since terminal 24 during the trace interval is at ground potential, the voltage developed across modulator inductor $L_m$ during the interval $t_2$–$t_4$ equals in magnitude supply voltage $V_0$. An upramping, sawtooth modulator current $i_m$, illustrated in solid-line in FIG. 2e, is developed in modulator inductor $L_m$ between times $t_2$–$t_4$, reaching a peak magnitude $I_m$ at time $t_4$, the end of the trace interval. The peak magnitude $I_m$ is established by the turn-on time within the trace interval of modulator transistor switch Q2. A later turn-on time, for example, results in a lower peak magnitude current for modulator current $i_m$ at the end of the horizontal trace interval.

Near the end of the horizontal trace interval, horizontal oscillator and driver circuit 20 applies a reverse-biasing voltage to the base of horizontal output transistor Q1 to cut off conduction of the transistor near time $t_4$ of FIG. 2, the beginning of the horizontal retrace interval, $t_4$–$t_6$. During horizontal retrace, line deflection current $i_H$ and modulator current $i_m$ flow in deflection retrace capacitor $C_{RH}$ and modulator retrace capacitor $C_{Rm}$, respectively, reverse biasing damper diodes D1 and D2.

During horizontal retrace, horizontal deflection winding $L_H$ and deflection retrace capacitor $C_{RH}$ form a deflection retrace resonant circuit 40. Also, during this interval, modulator switch $S_m$ advantageously remains closed enabling modulator inductor $L_m$ and modulator retrace capacitor $C_{Rm}$ to form a modulator retrace resonant circuit 50. The modulator retrace current flows in modulator switch $S_m$.

The resonance frequency of modulator retrace circuit 50 is advantageously selected to be approximately that of the horizontal retrace frequency of deflection retrace circuit 40. Thus, both horizontal deflection current $i_H$ and modulator $i_m$ undergo one-half cycle of resonant oscillation in their respective retrace resonant circuits during approximately the same interval, $t_4$–$t_6$, as illustrated in solid-line in FIGS. 2b and 2e.

The one-half cycle of resonant oscillation of currents $i_H$ and $i_m$ generate retrace pulse voltages $V_{RH}$ and $V_{Rm}$ in respective retrace capacitors $C_{RH}$ and $C_{Rm}$, as illustrated in solid-line in FIGS. 2c and 2f, respectively. The peak amplitudes, $V_{PH}$ and $V_{Pm}$, of retrace pulse voltages $V_{RH}$ and $V_{Rm}$, respectively, occur near the center of retrace, at time $t_5$, when currents $i_H$ and $i_m$ reverse direction.

After time $t_5$, the center of retrace, modulator current $i_m$ is negative and is returned to the $+V_0$ supply via the now conducting diode D3 of modulator switch $S_m$, reaching a negative peak value of substantially $-I_m$ at the end of retrace. Also at the end of retrace, near time $t_6$, retrace capacitors $C_{RH}$ and $C_{Rm}$ have fully discharged, enabling damper diodes D1 and D2 to become conductive, thereby initiating the beginning of the next horizontal trace interval.

When damper diode D2 begins conducting negative modulator current $i_m$ at the beginning of horizontal trace, near time $t_6$ of FIG. 2e, terminal 24 again becomes grounded. The negative modulator current $i_m$ flows from ground to the $+V_0$ supply via damper diode D2 and diode D3 of modulator switch $S_m$. After time $t_6$, the beginning of the next horizontal trace interval, switched mode correction voltage $V_m$, of FIG. 2d, is developed across modulator inductor $L_m$. Modulator current $i_m$, after time $t_6$, becomes an upramping, negative sawtooth current. Also, near time $t_6$, switched mode control circuit 30 generates the upper level of switching voltage $V_{b2}$ of FIG. 2h, thereby placing transistor Q2 of switch $S_m$ in a cutoff condition. Thus, when modulator current $i_m$ reaches zero at time $t_8$ of FIG. 2e, modulator switch $S_m$ becomes open-circuited due to the reverse biasing of diode D3 and the cutoff of transistor Q2.

No current flows in modulator inductor $L_m$ from time $t_8$ until time $t_{10}$, when transistor Q2 is again turned-on to advantageously apply modulator voltage $V_m$ directly to modulator inductor $L_m$. During the interval, $t_8$–$t_{10}$, modulator switch $S_m$ open-circuits the current path that trace switch $S_H$ provides for modulator current $i_m$ between voltage source $+V_0$ and modulator inductor $L_m$. During this interval, the potential developed across modulator inductor $L_m$ between terminals 23 and 24 is zero, with the two terminals being maintained essentially at ground potential by conduction in trace switch $S_m$.

Although switched mode control circuit 30 turns off transistor Q2 at the end of retrace near time $t_0$, the exact turn-off instant is not critical, provided the turn-off instant occurs when modulator current $i_m$ is negative. Thus control circuit 30 may turn off transistor Q2 at any instant after time $t_5$, the center of retrace, and before time $t_8$, when the negative modulator current $i_m$ has decreased in magnitude to zero.

Switched mode side pincushion correction circuit 60 modulates the amplitude of line scanning current $i_H$ by modulating the duty cycle of modulator voltage $V_m$. The DC component, $V_{m0}$, of modulator voltage $V_m$ of FIG. 2d, is controlled by and related to the duty cycle of modulator voltage $V_m$. Modulator inductor $L_m$, horizontal deflection winding $L_H$ and flyback transformer primary winding W1 are equivalent to DC short-circuit paths. Thus, the DC value of the voltage at terminal 24 equals $V_{m0}$, the DC value at terminal 23, and the DC value at terminal 22 and at the top terminal of trace capacitor $C_t$ equals the B+ voltage at terminal 21.

The average trace voltage $V_t$ developed across capacitor $C_t$, which determines the peak amplitude $I_{PH}$ of line scanning current $i_H$, equals the difference between the B+ voltage and the average modulator voltage $V_{m0}$. Decreasing the average modulator voltage $V_{m0}$ increases the average trace voltage and the amplitude of the line scanning current. Increasing the average modulator voltage $V_{m0}$ decreases the average trace voltage and the amplitude of the line scanning current.

The dashed-line waveforms of FIGS. 2b–2f and 2h illustrate operation of side pincushion correction circuit 60 in a manner that produces an increased amplitude line deflection current $i_H$, such as when scanning the center raster lines. Control circuit 30 initiates the generation of the lower level of switching control voltage $V_{b2}$ at a retarded instant, $t_3$, within the horizontal trace interval, as illustrated in dashed-line in FIG. 2h.

Modulator current $i_m$, illustrated in dashed-line in FIG. 2e, begins to increase in an upramping manner from the zero current level at the retarded instant $t_3$. Thus, when retrace begins at time $t_4$, modulator current $i_m$ has reached a peak current level $I'_m$ that is smaller in magnitude than the peak level $I_m$ of the corresponding solid-line waveform. Because the peak magnitude of modulator current $i_m$ is smaller, the modulator retrace pulse voltage $V_{Rm}$, illustrated in dashed-line in FIG. 2f, that is developed during horizontal retrace between times $t_4$–$t_6$, attains a lower peak magnitude $V'_{Pm}$ than the corresponding solid-line waveform.

At the beginning of the next horizontal trace interval, modulator current $i_m$ begins it upward ramping from a negative level, $-I'_m$, that is of a peak magnitude that is smaller than in the corresponding solid-line waveform. Modulator current $i_m$ reaches the zero current level at the earlier instant $t_7$ within the horizontal trace interval. At time $t_7$, diode D3 of modulator switch $S_m$ becomes reversed biased, open-circuiting the modulator switch and initiating the lower level of modulator voltage $V_m$, as illustrated in dashed-line in FIG. 2d.

By turning on modulator switch $S_m$ at the retarded instant $t_3$ within the horizontal trace interval, the upper, positive level of modulator voltage $V_m$ is developed for a shorter interval, $t_3$–$t_7$, resulting in a lower average modulator voltage $V'_{m0}$ of FIG. 2d. The lower average voltage $V'_{m0}$ produces a higher average trace voltage $V_t$ across trace capacitor $C_t$. The higher average trace voltage produces a higher amplitude line scanning current of magnitude $I'_{PH}$, as illustrated in dashed-line in FIG. 2b. The higher amplitude line scanning current produces during the horizontal retrace interval a higher amplitude retrace pulse voltage $V_{RH}$ having a peak magnitude $V'_{PH}$, illustrated in dashed-line in FIG. 2c.

The retrace pulse voltage $V_R$ that is applied to flyback transformer primary winding W1 is illustrated in FIG. 2a. Flyback transformer retrace pulse voltage $V_R$ equals the sum of the deflection retrace pulse voltage $V_{RH}$ and the modulator retrace pulse voltage $V_{RM}$. The sum remains unchanged even though the individual pulse components are varied by side pincushion correction circuit 60. The sum remains unchanged because the pulse components vary in an inverse or complementary relationship. Thus, the modulation of line scanning current $i_H$ does not affect the amplitude of flyback transformer retrace pulse voltage $V_R$, which amplitude remains constant and is determined by the B+ supply voltage developed at terminal 21. Retrace pulse voltage $V_R$ is used to generate the ultor accelerating potential at a terminal U of a high voltage circuit 43 that is coupled to a high voltage winding W2 of flyback transformer T1. Retrace pulse voltage $V_R$ is also used to energize other television receiver load circuits, illustrated schematically in FIG. 1 by the block 44 coupled to a winding W3 of flyback transformer T1.

Control circuit 30 generates switched mode control voltage $V_{b2}$ in the following manner. A positive horizontal flyback pulse voltage 41 developed by a winding W4 of flyback transformer T1 is differentiated by a differentiating network comprising capacitor 36 and resistors 37 and 38. The differentiated flyback pulse is applied to the base of a PNP transistor Q3. The trailing edge of horizontal flyback pulse 41 produces a negative spike or pulse near time $t_0$ of FIG. 2 that turns on transistor Q3 and charges a capacitor 35 of a ramp generating network 45 to a voltage $V_1$, as illustrated in FIG. 2g by the voltage $V_{Hs}$ developed across capacitor 35.

The short duration negative going spike decays rapidly near time $t_6$ to turn off transistor Q3 shortly after it is turned on. Thus, near time $t_6$, capacitor 35 begins to discharge through a resistor 34 of ramp generating network 45. Voltage $V_{Hs}$, of FIG. 2g is therefore a ramp voltage that decreases to the lower voltage level $V_2$ by time $t_6$, when the negative going spike produced by the subsequent horizontal flyback pulse 41 resets the ramp.

Horizontal ramp voltage $V_{Hs}$ is AC coupled to the base of a control transistor Q5 via an emitter-follower transistor Q4, the wiper arm of an emitter resistor 33, a DC blocking capacitor 31 and a summing resistor 32. Horizontal ramp voltage $V_{Hs}$ is summed at the base of transistor Q5 with a vertical rate parabola voltage 42, conventionally derived, that is AC coupled to the base of the transistor via a resistor 28 and a DC blocking capacitor 29. DC bias for the base of transistor Q5 is provided by the $+V_0$ supply that is coupled to the transistor base via a horizontal width control potentiometer 26 and a resistor 27.

The collector of control transistor Q5 is coupled to the $+V_0$ supply via a resistor 39 and is directly coupled to the base of an inverting transistor Q6. The collector of inverting transistor Q6 is coupled to the $+V_0$ supply via a resistor 47 and is coupled to the base of modulator switch transistor Q2 via resistor 25. Switched mode control voltage $V_{b2}$ is developed at the collector of inverting transistor Q6.

In operation, when horizontal ramp voltage $V_{Hs}$ is reset to its upper voltage level $V_1$ at time $t_0$, the positive going edge of the ramp is coupled to the base of control transistor Q5, turning the transistor on and turning off transistor Q6. The upper voltage level of switched mode control voltage $V_{b2}$ of FIG. 2h is thereby developed to place modulator switch transistor Q2 in a reverse biased state.

At a controllable instant within the horizontal trace interval, AC-coupled ramp voltage $V_{Hs}$ has decreased to a level sufficient to cutoff control transistor Q5, enabling the lower level of switched mode control voltage $V_{b2}$ to be generated. Modulator switch transistor Q2 is thereby turned on and applies the $+V_0$ voltage directly to modulator inductor $L_m$.

The time within horizontal trace when control transistor Q5 is turned off is determined by the level that vertical parabola voltage 42 assumes during a given horizontal deflection cycle. Near the center of vertical raster scanning, vertical parabola voltage 42 attains a level that provides a bias to control transistor Q5 that permits horizontal ramp voltage $V_{Hs}$ to turn off the transistor at the relatively retarded instant $t_3$ when the ramp voltage has decreased to a voltage level $V_b$ of FIG. 2g. Side pincushion correction circuit 60 thereby produces a relatively high amplitude line scanning current $i_H$. Near the top and bottom of vertical raster scanning, vertical parabola voltage 42 is at a relatively low voltage level, permitting horizontal ramp voltage $V_{Hs}$ to decrease to a voltage level $V_a$ before turning off control transistor Q5 at the relatively advanced instant $t_2$. Side pincushion correction circuit 60 thereby produces a relatively small amplitude line scanning current.

Other modulation control voltages, in addition to or in place of vertical parabola voltage 42, may be coupled to the base of transistor Q5 to modulate the amplitude of line scanning current $i_H$. For example, a modulation control voltage representative of beam current loading of ultor terminal U may be used to correct for raster width variations with ultor loading.

As described, side pincushion correction circuit 60 provides modulation of line deflection current $i_H$ by advantageously operating in the switched mode while avoiding the use of a modulator capacitor. Switched mode modulator voltage $V_m$ is applied directly to modulator inductor $L_m$. Modulator inductor $L_m$ functions to integrate the rectangular wave voltage $V_m$, thereby avoiding the use for that purpose of an additional, large valued input choke.

In accordance with another feature of the invention, modulator switch $S_m$ controllably decouples modulator inductor $L_m$ from line deflection switch $S_H$ and supply voltage $+V_0$ for a variable period during the horizontal trace interval, thereby reducing the amount of circulating current flowing between modulator inductor $L_m$ and trace switch $S_H$.

Additionally, because modulator switch $S_m$ is conductive during the entirety of horizontal retrace, deflection retrace resonant circuit 40 and modulator retrace resonant circuit 50 are advantageously coupled together by modulator switch $S_m$ in a balanced bridge configuration during the entirety of horizontal retrace. This bridge configuration avoids undesirable retrace time modulation of deflection retrace pulse voltage $V_{RH}$ and flyback transformer retrace pulse voltage $V_R$. The bridge configuration also exists during trace but only when modulator switch $S_m$ is conductive. One branch is the series coupled deflection winding $L_H$ and trace capacitor $C_t$. Another branch is the series coupled modulator inductor $L_m$ and the $+V_0$ supply voltage source.

What is claimed:

1. A deflection circuit with a switched mode modulator circuit, comprising:
   a line deflection winding;
   a trace capacitance for developing a line trace voltage;
   a trace switch coupled to said line deflection winding and said trace capacitance and operated at a line rate for applying said trace voltage to said line deflection winding during a line trace interval to generate a line scanning current in said line deflection winding;
   a deflection retrace capacitance coupled to said line deflection winding for forming a deflection retrace resonant circuit during a line retrace interval to generate a deflection retrace pulse voltage;
   a modulator inductance coupled to said trace switch and to said line deflection winding;
   a modulator retrace capacitance coupled to said modulator inductance for forming a modulator retrace resonant circuit to generate a modulator retrace current in said modulator inductance during said line retrace interval;
   a source of supply voltage; and
   a modulator switch coupled to said trace switch, to said source and to said modulator inductance and responsive to a line rate signal and to a modulator control signal for switching between conductive and nonconductive states at a controllable instant within said line trace interval that varies in accordance with said modulation control signal to generate a switched mode modulation voltage that is directly applied to said modulator inductance for modulating said line scanning current in accordance with said modulator control signal,
   wherein said modulator switch is conductive during said line retrace interval to provide therethrough a current path for said modulator retrace current.

2. A circuit according to claim 1 wherein said modulator inductance integrates said switched mode modulation voltage into said modulator current.

3. A circuit according to claim 1 wherein, during said trace interval, said trace switch in cooperation with said modulator switch develops said supply voltage between first and second terminals of said modulator inductance when said modulator switch is in one of two conductive states and maintains the two terminals at the same potential when said modulator switch is in the other conductive state.

4. A circuit according to claim 1 wherein said modulator switch conducts modulator current in said modulator inductance during the entirety of said retrace interval and during the beginning and ending portions of said trace interval and prevents current from flowing in said modulator inductance during said variable period within said trace interval.

5. A circuit according to claim 4 wherein said modulator switch includes a first element that conducts said modulator current during the ending portion of said trace interval and during the beginning portion of said retrace interval and includes a second element that conducts said modulator current during the remaining portion of said retrace interval and during said beginning portion of said trace interval.

6. A circuit according to claim 4 wherein said modulator switch switches into conduction at said controllable instant for applying said supply voltage to said modulator inductance to initiate an upramping portion of said modulator current.

7. A circuit according to claim 4 wherein said modulator switch open-circuits during said variable period a current path for said modulator current provided by said trace switch between said source and said modulator inductance.

8. A circuit according to claim 1 wherein said modulator switch, when conductive, directly applies said supply voltage to a first terminal of said modulator inductance and, when nonconductive, decouples said modulator inductance with respect to said source of supply voltage.

9. A circuit according to claim 8 wherein said trace switch directly couples a second terminal of said modulator inductance to said source of supply voltage during the entirety of said trace interval when said trace switch is conductive and wherein a resonant current from said modulator retrace capacitance flows between said first and second terminals of said modulator inductance during said retrace interval when said trace switch is nonconductive.

10. A circuit according to claim 9 wherein, during said trace interval, said trace switch in cooperation with said modulator switch develops said supply voltage between said first and second terminals of said modulator inductance when said modulator switch is conductive and maintains the two terminals at the same potential when said modulator switch is nonconductive.

11. A circuit according to claim 1 wherein said modulator switch is conductive during the entirety of said retrace interval to couple via said modulator switch said deflection retrace resonant circuit to said modulator retrace resonant circuit in a bridge configuration.

12. A circuit according to claim 11 where the resonance frequencies of said deflection and modulator retrace resonant circuits are substantially the same.

13. A circuit according to claim 12 wherein said trace switch comprises a first damper diode paralleling said deflection retrace capacitance, a second damper diode coupled to said first damper diode and to said modulator inductance and paralleling said modulator retrace capacitance, and a switching element having a first main current terminal coupled to said first damper diode and to said deflection winding and having a second main current terminal coupled to said second damper diode and to said source of supply voltage.

14. A deflection circuit with a switched mode side pincushion correction circuit, comprising:
   a line deflection winding;
   a trace capacitance for developing a line trace voltage;

trace switching means coupled to said line deflection winding and said trace capacitance and operated at a line rate for applying said trace voltage to said line deflection winding during a line trace interval to generate a line scanning current in said line deflection winding;

a deflection retrace capacitance coupled to said line deflection winding for forming a deflection retrace resonant circuit during a line retrace interval to generate a deflection retrace pulse voltage;

a modulator inductance coupled to said trace switching means and to said line deflection winding;

a modulator retrace capacitance coupled to said modulator inductance for forming a modulator retrace resonant circuit during said line retrace interval;

a source of supply voltage; and modulator switching means coupled to said trace switching means, to said source and to said modulator inductance and responsive to line and field rate signals for applying said supply voltage to said modulator inductance at a variable instant within said line trace interval that varies in accordance with said field rate signal to provide a side pincushion corrected line scanning current, said modulator switching means generating an upramping modulator current in said modulator inductance that flows from said source of supply voltage and that starts at a zero current level at said variable instant to reach at the end of said trace interval a peak magnitude that changes in accordance with said field rate signal.

15. A circuit according to claim 14 wherein said modulator switching means is conductive during the entirety of said retrace interval to return said modulator current to said source of supply voltage during the ending portion of said retrace interval and during the beginning portion of said trace interval until said modulator current reaches a zero current level at a second variable instant within said trace interval that is earlier than the first mentioned variable instant and that varies in accordance with said field rate signal.

16. A circuit according to claim 15 wherein the duration between the two aforementioned variable instants also varies in accordance with said field rate signal.

17. A deflection circuit with a switched mode side pincushion correction circuit, comprising:

a line deflection winding;

a trace capacitance for developing a line trace voltage;

trace switching means coupled to said line deflection winding and said trace capacitance and operated at a line rate for applying said trace voltage to said line deflection winding during a line trace interval to generate a line scanning current in said line deflection winding;

a deflection retrace capacitance coupled to said line deflection winding for forming a deflection retrace resonant circuit during a line retrace interval to generate a deflection retrace pulse voltage;

a modulator inductance coupled to said trace switching means and to said line deflection winding;

a modulator retrace capacitance coupled to said modulator inductance for forming a modulator retrace resonant circuit during said line retrace interval, a source of supply voltage; and modulator switching means coupled to said trace switching means, to said source and to said modulator inductance, and being responsive to line and field rate signals for switching between conductive and nonconductive states at a controllable instant within said line trace interval that varies in accordance with said field rate signal to provide a side pincushion corrected line scanning current, said modulator switching means open-circuiting a current path between said modulator inductance and said trace switching means for a variable period within said line trace interval in accordance with said field rate signal.

18. A deflection circuit with a switched mode modulator circuit, comprising:

a line deflection winding;

a trace capacitance for developing a line trace voltage;

a trace switch coupled to said line deflection winding and said trace capacitance and operated at a line rate for applying said trace voltage to said line deflection winding during a line trace interval to generate a line scanning current in said line deflection winding;

a deflection retrace capacitance coupled to said line deflection winding for forming a deflection retrace resonant circuit during a line retrace interval to generate a deflection retrace pulse voltage;

a modulator inductance coupled to said trace switch and to said line deflection winding;

a modulator retrace capacitance coupled to said modulator inductance at a first terminal of said inductance for forming a modulator retrace resonant circuit to generate a modulator retrace current in said modulator inductance during said line retrace interval;

a source of supply voltage; and a modulator switch coupled to said trace switch, to said source and to said modulator inductance and responsive to a line rate signal and to a modulator control signal for switching between conductive and nonconductive states at a controllable instant within said line trace interval that varies in accordance with said modulation control signal to generate a switched mode modulation voltage that is directly applied to a second terminal of said modulator inductance for modulating said line scanning current in accordance with said modulator control signal, the retrace resonance frequency exhibited by said modulator retrace resonant circuit being established substantially at the retrace resonance frequency of said deflection retrace resonant circuit in accordance with the capacitive value of said modulator retrace capacitance and in accordance with the value of the inductance between said first and second terminals of said modulator inductance.

19. A deflection circuit with a switched mode modulator circuit, comprising:

a line deflection winding;

a trace switch coupled to said line deflection winding for generating a line scanning current in said line deflection winding;

a deflection retrace capacitance coupled to said line deflection winding for forming a deflection retrace resonant circuit during a line retrace interval to generate a deflection retrace pulse voltage;

a source of a DC supply voltage;

a modulator switch coupled to said source;

a single modulation inductor directly coupled to said modulator switch and to said line deflection winding to develop said DC supply voltage at a terminal of said single modulation inductor in a first switching state of said modulator switch; and a control circuit coupled to said modulator switch and responsive to a line rate signal and to a modulator control signal for switching said modulator switch between said first and a second switching state at a controllable instant within said line scanning interval to generate a modulated bidirectional current in said modulation inductor for concurrently modulating said line scanning current.

20. A deflection circuit with a switched mode modulator circuit, comprising:

a line deflection winding;

a trace switch coupled to said line deflection winding for generating a line scanning current in said line deflection winding;

a deflection retrace capacitance coupled to said line deflection winding for forming a deflection retrace resonant circuit during a line retrace interval to generate a deflection retrace pulse voltage;

a modulator inductance coupled to said trace switch and to said line deflection winding;

a modulator retrace capacitance coupled to said modulator inductance for forming a modulator retrace resonant circuit during said line retrace interval;

a source of DC supply voltage; and a bidirectionally conductive modulator switch coupled to said source and to said modulator inductance for generating a bidirectional current between said source and said modulator inductance via said modulator switch, said modulator switch being responsive to a line rate signal and to a modulator control signal for switching between conductive and nonconductive states at a controllable instant within said line scanning interval that varies in accordance with said modulation control signal for modulating said bidirectional current in accordance with said modulation control signal.

* * * * *